United States Patent [19]

Magara et al.

[11] Patent Number: 5,434,380
[45] Date of Patent: Jul. 18, 1995

[54] SURFACE LAYER FORMING APPARATUS USING ELECTRIC DISCHARGE MACHINING

[75] Inventors: Takuji Magara, Aichi; Nagao Saito, Tokyo; Naotake Mohri, Aichi, all of Japan

[73] Assignee: Mitsubishi Denki Kabushiki Kaisha, Tokyo, Japan

[21] Appl. No.: 923,589

[22] Filed: Aug. 3, 1992

Related U.S. Application Data

[63] Continuation-in-part of Ser. No. 552,669, Jul. 16, 1990, abandoned.

[30] Foreign Application Priority Data

Dec. 25, 1991 [JP]  Japan ................... 3-357138

[51] Int. Cl.$^6$ ............................................. B23H 1/00
[52] U.S. Cl. .................... 219/69.13; 219/69.14; 427/580
[58] Field of Search .............. 118/308; 219/69.11, 219/69.13, 69.14, 69.15, 69.18, 69.2, 69.16, 69.2; 427/580

[56] References Cited

U.S. PATENT DOCUMENTS

| | | | |
|---|---|---|---|
| 3,365,612 | 1/1968 | Schierholt | 219/69.13 |
| 3,594,299 | 7/1971 | Inoue | 219/69.13 |
| 3,600,546 | 8/1971 | Niwa et al. | 219/69.14 |
| 3,655,936 | 4/1972 | Saito et al. | 219/69.13 |
| 4,375,588 | 3/1983 | Frei | 219/69.14 |
| 4,628,173 | 12/1986 | Ito | 219/69.2 |
| 4,870,243 | 9/1989 | Wilson et al. | 219/69.14 |
| 4,945,199 | 7/1990 | Tanaka et al. | 219/69.13 |
| 4,948,625 | 8/1990 | Suzuki et al. | 427/580 |
| 4,950,860 | 8/1990 | El-Menshawy | 219/69.18 |
| 4,952,768 | 8/1990 | Mohri et al. | 219/69.15 |
| 5,118,915 | 6/1992 | Magara | 219/69.13 |

FOREIGN PATENT DOCUMENTS

| | | | |
|---|---|---|---|
| 60-177819 | 9/1985 | Japan | 219/69.13 |
| 2-83119 | 3/1990 | Japan . | |
| 787731 | 11/1954 | United Kingdom | 219/69.14 |
| 828336 | 2/1960 | United Kingdom . | |

OTHER PUBLICATIONS

"Study On High Speed Electrical Discharge Machining", by Hisao Kurafuji and Ko Suda No Publication date.

*Primary Examiner*—Geoffrey S. Evans
*Attorney, Agent, or Firm*—Sughrue, Mion, Zinn, Macpeak & Seas; Richard C. Turner

[57] ABSTRACT

An apparatus for forming surface layers on electrodes by electric discharge machining. A machining gap, between an electrode and a workpiece is filled with a dielectric mixture containing metallic or submetallic powder. The apparatus uses a swinging mechanism to move the electrode during processing. The apparatus uses a high-voltage superposition circuit to superpose a voltage of 100–400 V across the gap. The apparatus uses a current limiting resistor of 100–300Ω to ensure that the main circuit supplies a low voltage of approximately 100 V to the machining gap. In a second embodiment, the apparatus prevents electrode cracking by dispersing the discharges throughout, and widening, the machining gap.

12 Claims, 18 Drawing Sheets

MACHINING CONDITION
SUS-304 ⊖
PULSE WIDTH : 8 μsec
AVERAGE CURRENT: 2A

FIG. 10

| SWING MOTIONS | | CONTENT |
|---|---|---|
| A RADIAL PATTERN 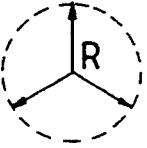 | 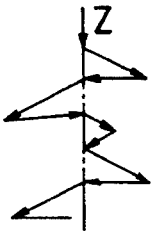 | MACHINING IN A RADIAL PATTERN.(INPUT IN POLAR COORDINATE) |
| B POLYGONAL PATTERN  | | INPUT PLURAL POINTS IN POLAR COORDINATE AND MACHINE IN A POLYGONAL PATTERN DEFINED BY THE PLURAL POINTS. |
| C VOLUNTARY LOCUS 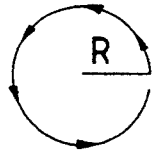 | | INPUT PLURAL POINTS IN CARTESIAN COORDINATE AND MACHINE IN A VOLUNTARY LOCUS DEFINED BY THE PLURAL POINTS. |
| D CIRCULAR PATTERN | | INPUT CIRCULAR PATTERN AND MACHINE ALONG THE PATTERN HAVING RADIUS R. |
| E AUTO-EXPANSION (A, B, D) 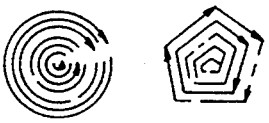 | | MACHINE ALONG THE ABOVE PATTERN A, B OR D AND MACHINE SUCCESSIVELY IN THE EXPANDED PATTERNS. |
| F TAPER-MACHINING (A, B, D) | 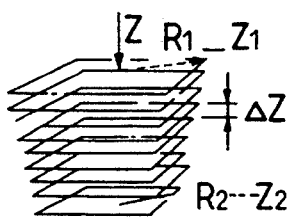 | MACHINE ALONG THE ABOVE PATTERN A, B OR D SUCCESSIVELY WITH AN INCLINED ANGLE OF $\theta = \tan^{-1}\dfrac{R_1 - R_2}{Z_2 - Z_1}$ |

Rmax=6μm

Rmax=4μm

Rmax=1μm

MACHINING CONDITION
SUS-304 ⊖
PULSE WIDTH: 8μsec
AVERAGE CURRENT: 2A

MACHINING CONDITION
SKH-51
PULSE WIDTH: 2μsec
MACHINING AREA: 100×100[mm]

$t = RC$ $R_2 = 20\Omega$ $R_2 = 200\Omega$

TOOL ELECTRODE: FC. WORKPIECE: $S_2$
$R_0 = 4\Omega$, $V_C = 65V$, $C_1 = 0.1\mu F$
CRACK CONDITION (CROSS-SECTION)

$I_p = 10A$, $\tau_p = 16\mu s$, $\tau_r = 16\mu s$
SKH-51 ORDINARY MACHINING SOLUTION $I_p = 10A$, $\tau_p = 16\mu s$, $\tau_r = 16\mu s$
SKH-51  KEROSINE + Si POWDER  20g/ℓ

SURFACE LAYER FORMING APPARATUS USING ELECTRIC DISCHARGE MACHINING

This application is a Continuation-in-Part of U.S. application Ser. No. 07/552,669 filed Jul. 16, 1990, now abandoned.

BACKGROUND OF THE INVENTION

1. Field of the Invention

The present invention relates to an electronic discharge machining (EDM) process for forming a surface layer having a mirror-finish on a workpiece. Particularly, it relates to a process for forming a surface layer by electric discharge machining, which provides a finely-machined surface and improves the surface's resistance to corrosion and wear by promoting discharge dispersion at the surface of a workpiece material and conducting surface treatment of the workpiece during the EDM process.

2. Description of the Background Art

A process is known (see Japanese Patent Disclosure Publication No. 24916 published in 1987) in the art of electric discharge machining which uses an electrode formed of a submetal material (i.e., a semiconductive material), such as silicon. During EDM, the submetal electrode forms a solid surface layer that is not susceptible to aqua regia and is difficult to damage, e.g., it is not spallable or easily cracked when subjected to several tons of force. This known process employs an ordinary electric discharge machining system with a submetal electrode, conducting machining on a workpiece made of SUS304 (18Cr—8Ni stainless steel), 13Cr steel or high-speed steel. A highly corrosion-resistant surface is formed on the surface of the SUS304, 13Cr steel or high-speed steel by carrying out such machining for several minutes to several hours.

Further, adding a mixture of metallic or submetallic (semiconductor) powder into the machining dielectric fluid improves the stability of discharge. Moreover, the degree to which the mixture enhances the mechanical properties (e.g., corrosion resistance and wear resistance) of the electrode and workpiece surfaces depends on the material being mixed in. It is thus possible to employ the electric discharge machining process for the surface treatment of metal, in addition to its conventional use in metal removal. The type of powder material used is, for example, a semiconductor material such as silicon.

In general a high-voltage superposition circuit is employed as the machining power supply. When the voltage of the high-voltage superposition circuit is large, cracking and/or pitting occur less in the workpiece surface. Further, if silicon powder is present in the machining gap, an electrical spark is generated more easily over a longer machining gap distance, even if the applied voltage remains constant. However, applying a higher voltage will further stabilize machining. The corrosion and wear resistance of a workpiece machined in such a manner improves considerably.

The superposition of a voltage of approximately 100 to 400 V has been shown to stabilize machining and suppress cracking and pitting. This leads to a considerable improvement in corrosion resistance and wear resistance. Moreover, surface roughness is also reduced. However, the powder material breaks down during discharge operations and will usually reach its life expectancy after about 100 to 200 hours of use.

In addition, while the mixture of the powder suppresses cracking and pitting, enhances corrosion and wear resistance, and reduces surface roughness, these effects are not consistently reproduceable under any given machining condition. Specifically, experiments have shown that the mixture of the powder enhances the above noted effects by a greater amount when the applied voltage is low. The effects decrease abruptly when the voltage moves beyond a certain applied voltage. More specifically, the surface roughness increases greatly as the applied voltage increases.

An electrode employed in a conventional method (FIG. 13) comprises a silicon plate bonded to a copper rod 2 with an electrically conductive bonding agent 3. The electrode may be formed by mechanically machining a silicon block or by discharge-machining a silicon block.

When a metal mold is processed, according to the above-described method, a copper or graphite electrode that has a low consumption rate is used to roughly shape the surface and then a silicon electrode is used to finish the surface. This two step process ensures that the mold's surface is corrosion-resistant and wear-resistant. Two steps are required since silicon material is expensive, and a silicon electrode is quickly consumed during the discharge machining operation (approximately ten times as fast as the copper or graphite electrode). Thus, it is not economical to use a silicon electrode in EDM operations which remove a large amount of material from the workpiece.

In other words, a strong surface cannot be formed on the workpiece without using two different electrodes, such as a shaping electrode (made of copper or graphite) and a finishing electrode (made of silicon).

In view of the above disadvantages, it is desirable to provide a method for forming a workpiece surface, by using the shaping electrode of copper or graphite, which has the same characteristics as a workpiece surface formed by the finishing electrode of silicon.

SUMMARY OF THE INVENTION

Accordingly, an object of the invention is to solve the problems accompanying a conventional method of forming a strong surface on a workpiece by electric discharge processing.

More specifically, an object of the invention is to provide an EDM method for forming a surface layer on a workpiece, wherein particles of material are used to form the surface layer and are provided in an inter-electrode gap between a machining electrode and a workpiece, such that the workpiece surface is refined or a cover coating is formed thereon, even when using a shaping electrode made of copper or graphite.

Another object of the invention is to provide an EDM method for forming a surface layer, in which the particles of material used to form the surface layer are prevented from sticking to one another, thereby preventing a decrease in the flatness of the workpiece's surface.

Another object of the present invention is to provide a surface layer forming process using electric discharge machining techniques which reduce surface roughness sharply and maintain consistent machining characteristics for a longer period of time, while maintaining the machining stability and capability.

Another object of the invention is to provide a surface layer forming process using electric discharge machining techniques which enhances the effects of a powder mixture such as by reducing the surface roughness and maintaining constant machining characteristics for a longer period of time, while maintaining the machining stability and capability.

The foregoing objects and other objects of the invention have been achieved by the provision of a method for forming a surface layer on a workpiece by electric discharge processing, wherein a material made of fine particles is used to form the surface layer and is provided in a discharge gap between the workpiece and a machining electrode. Electric discharges are induced into the discharge gap to form the workpiece's surface layer. The fine particles are evaporated and molten during the electric discharge machining operation and struck against the workpiece to form a strong surface layer on the workpiece.

Further in the present method, the electric discharges may be induced while the fine particles in the discharge gap are moved in a swinging motion. The swinging motion prevents the fine particles from sticking to one another, thereby forming a surface layer having very little surface roughness.

The present invention provides a surface layer forming process using electric discharge machining which reduces surface roughness and maintains constant machining characteristics for a longer time period by lengthening the powder life, while simultaneously maintaining machining stability and capability. According to one embodiment, a workpiece is machined in the machining gap formed between an electrode and the workpiece and is surrounded with dielectric fluid mixed with metallic or submetallic powder. This embodiment uses a high-voltage superposition circuit to superpose a voltage of 100–400 V and uses a current limiting resistor of 100–300Ω to ensure that the main circuit supplies a low voltage of approximately 100V to the machining gap.

Another embodiment provides a surface layer forming process by electric discharge machining which prevents cracking by dispersing discharge throughout the machining gap. The invention also reduces surface roughness and maintains constant machining characteristics for a longer time period, while simultaneously maintaining the machining stability and capability. According to this embodiment, a workpiece is machined in the machining gap formed between an electrode and the workpiece and surrounded with dielectric fluid mixed with metallic or submetallic powder, by supplying a discharge current that will not cause cracking during a single electric spark.

BRIEF DESCRIPTION OF THE DRAWINGS

FIG. 10 is an explanatory diagram showing the patterns of swinging motion employed in the apparatus shown in FIG. 9;

DESCRIPTION OF THE PREFERRED EMBODIMENTS

Figure 1:
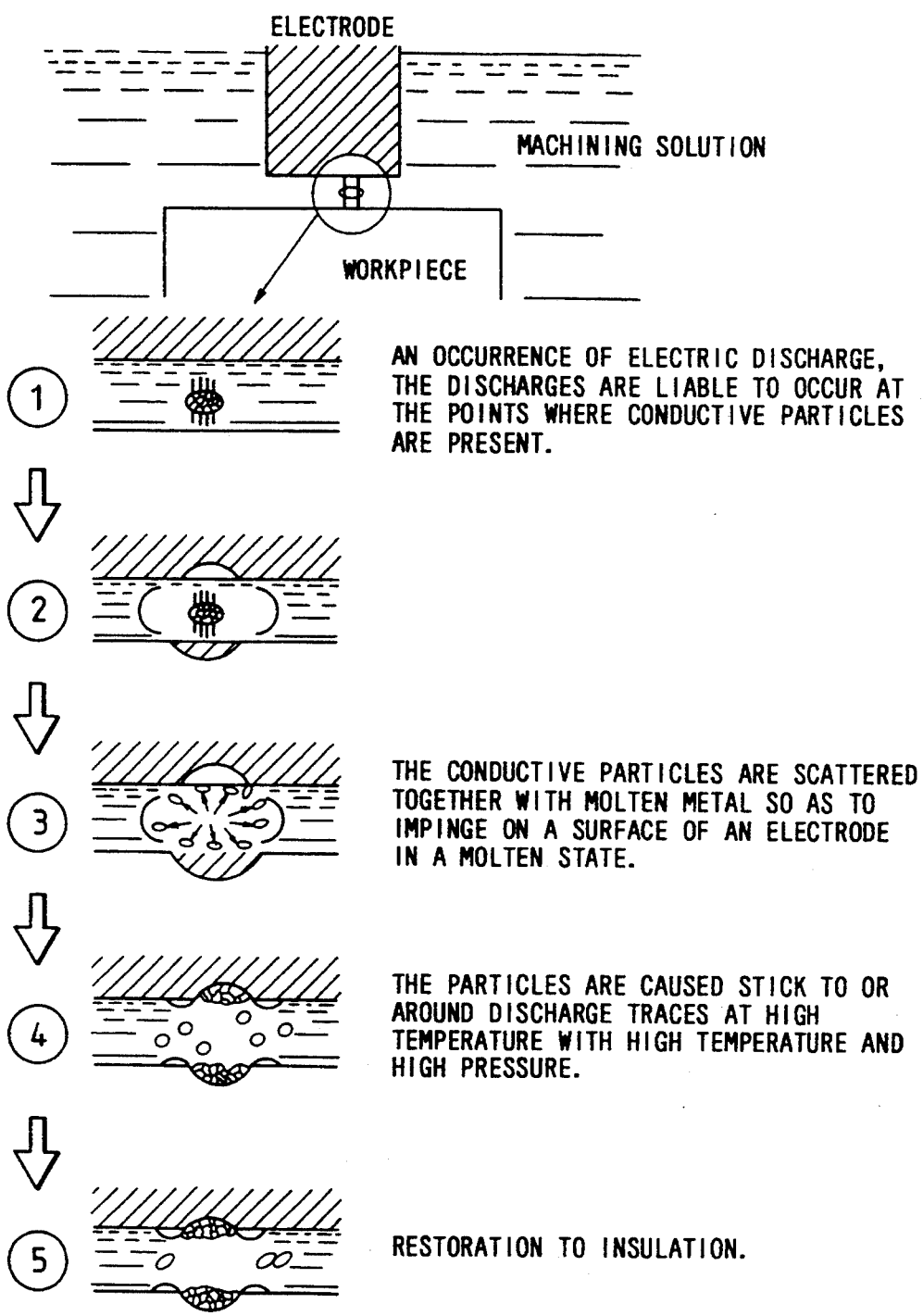
FIGS. 1 and 2 are explanatory diagrams for a description of the principle of the invention.

Prior to describing embodiments of the invention, the principle of the present invention will be described with reference to FIGS. 1 and 2.

Figure 2:
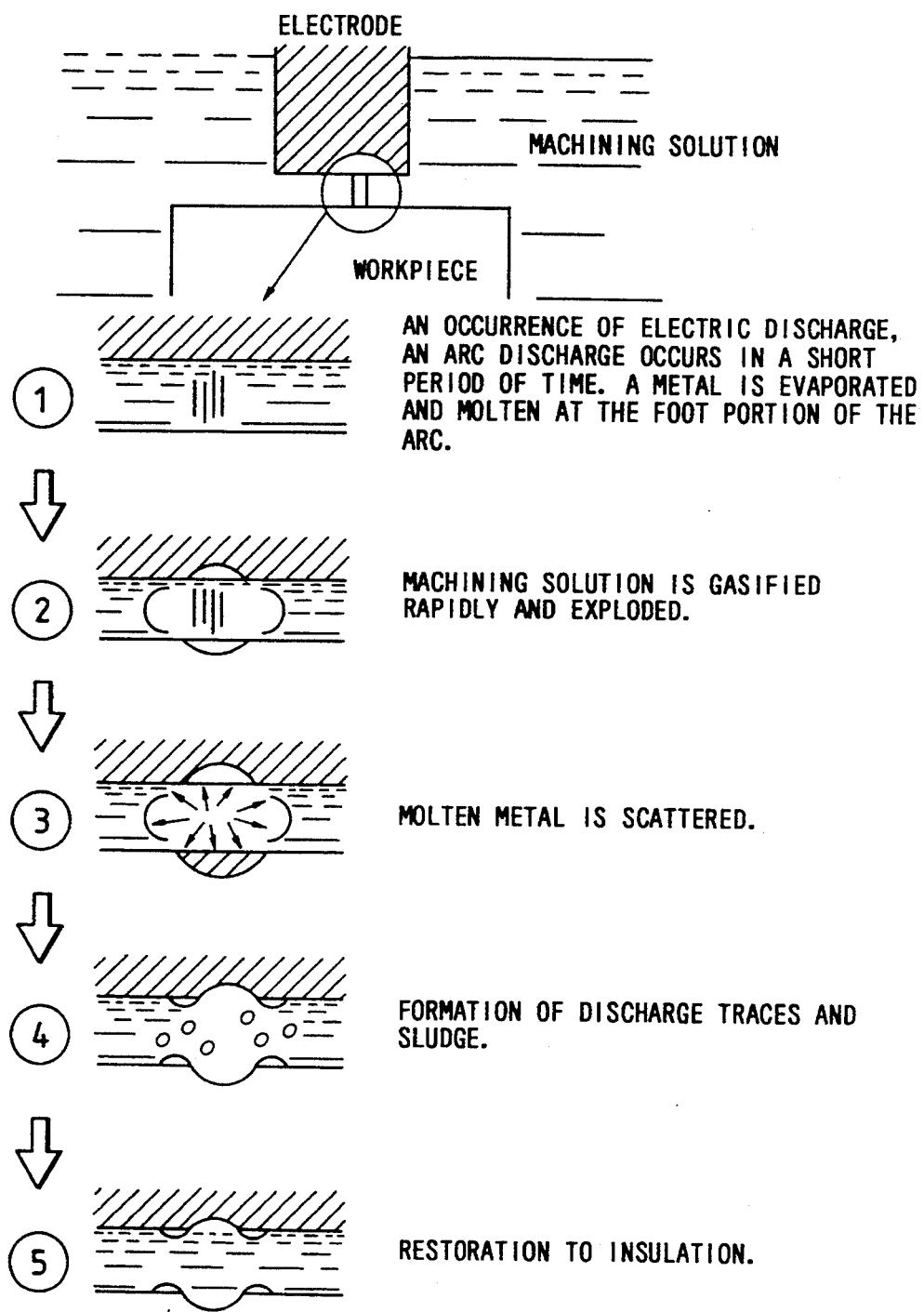

FIG. 2 shows an ordinary electric discharge machining operation. More specifically, it shows induction of electric discharges (steps 1 and 2), the scattering or spattering of molten metal (step 3), formation of discharge traces and sludge (step 4), and restoration to the normal insulated condition (step 5). FIG. 1 shows an electric discharge machining operation carried out with electrically conductive or semiconductive particles between the electrode and the workpiece.

Electric discharges are most likely to occur at the points where the particles (e.g., silicon) are present because the presence of the particles reduces the distance (and the effective resistance) between the electrode and the workpiece. When an electric discharge occurs, the particles break down into finer particles (step 3) through melting and the like and are subjected to high pressure and high temperature. These pressure and temperature increases cause the particles to stick or be melted into the faces of the electrode and the workpiece (step 4). In this process, the electrode, which is made of copper, graphite and the like, may be also become molten. Thus, it is possible that electrode material will also stick to the faces of the workpiece.

However, electrode material sticking to the workpiece is prevented by the silicon particles, which are disposed between the electrode and the workpiece, and which are closer to the machining point than the electrode. Disposing the silicon particles in such a manner ensures that almost all of the particles adhered to or adsorbed into the workpiece are silicon particles rather than electrode material.

Figure 3A:
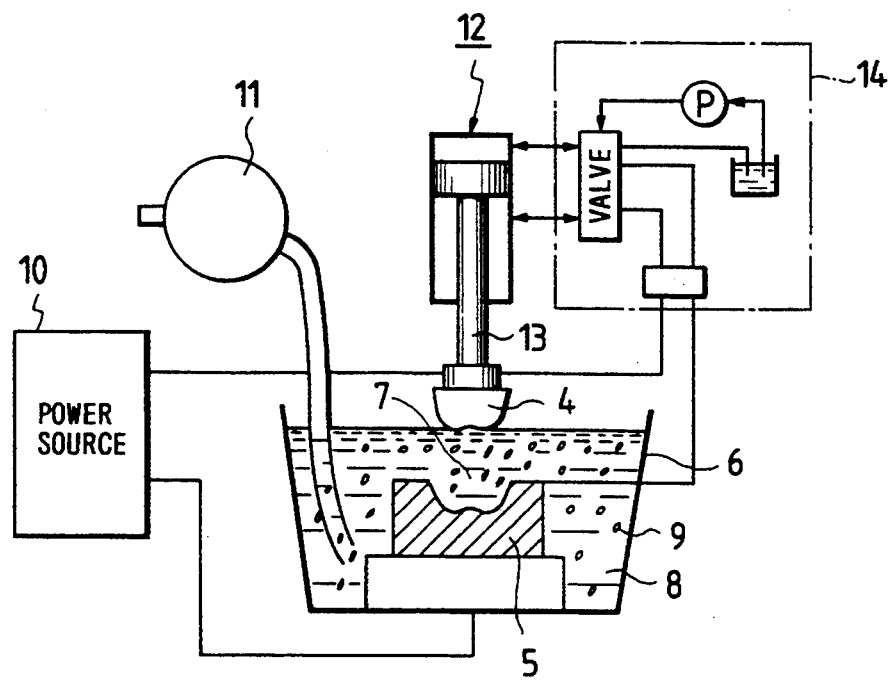
FIGS. 3(a) and 3(b) are schematic diagrams illustrating the arrangement of an apparatus for practicing an example of a method of forming a surface layer by electric discharge machining according to the present invention.
Figure 3B:
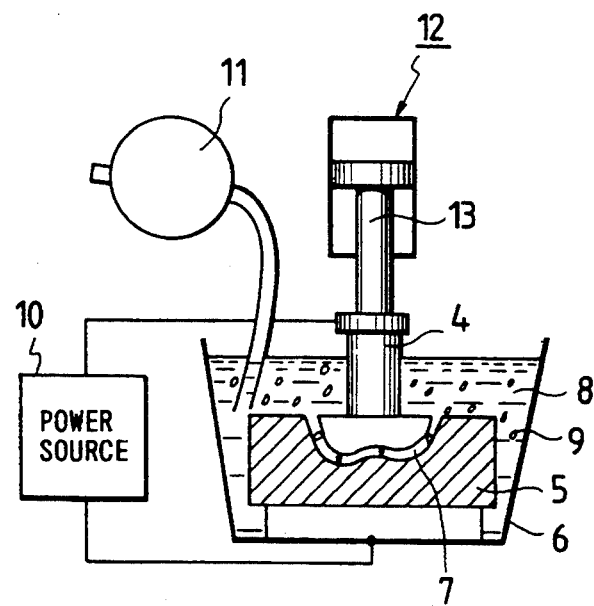

The operation of the present system will now be described with reference to a general structural diagram in FIGS. 3(a) and 3(b). FIG. 3(a) shows the system in a non-machining mode and FIG. 3(b) shows the system in a machining mode. As shown, an electrode 4 and a workpiece 5 are positioned in a machining tank 6, with the workpiece 5 and the electrode 4 forming a machining gap 7. A dielectric fluid 8 in the machining tank 6 includes a silicon powder 9. A power supply unit 10 is used for supplying machining energy to the machining gap 7, and a pneumatic pump 11 is used for agitating the dielectric 8 by feeding air into the machining tank 6. A hydraulic cylinder device 12 is used for vertically moving the electrode 4 toward and away from the workpiece 5, with a piston rod 13, and a servo unit 14 is used for controlling the hydraulic cylinder device 12.

In the apparatus thus constructed, the machining solution 8 is mixed with the silicon particles 9 having an average grain size of approximately 20 to 40 μm with a silicon particle mixture ratio of approximately 20 gr/l of machining solution. The air pump 11 supplies air to agitate the machining solution 6, thereby preventing the deposition of the silicon particles. As shown in FIGS. 3(a) and 3(b), the electrode is automatically intermittently moved up and down, so that the decomposition from the machining solution and the sludge, which are formed by electric discharge, are not accumulated in the discharge gap 7 (i.e., they are diffused therein). The air pump 11 may be replaced with a machining solution circulating pump. The electrode is formed of copper and graphite.

Figure 4A:
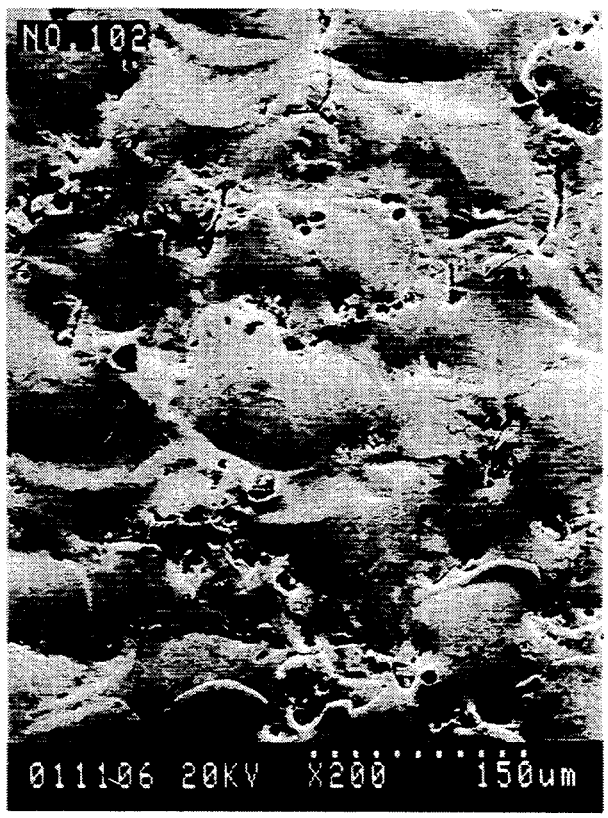
FIGS. 4(a) and 4(b), and FIGS. 5(a) and 5(b) are microphotographs showing the structures of metal, for a description of the effects of the invention.
Figure 4B:

FIGS. 4 and 5 are microphotographs showing the surface condition of the workpiece (i.e., the structure of the metal) to illustrate the effects of the present method. In FIGS. 4(a) and 4(b), an electrode of copper and a workpiece of SKH-51 were employed, and the following electrical conditions were established:

current peak=10 A,
pulse width=16 μs, and
pause interval=16 μs.

In FIG. 4(a), kerosene was used as the machining solution, and the surface roughness was 9 μm Rmax. In FIG. 4(b), the machining solution was kerosene with silicon particles of 20 g per liter added thereto (average grain size 20 to 40 μ), and the surface roughness was 4 μm Rmax.

Figure 5A:
Figure 5B:

In FIGS. 5(a) and 5(b), an electrode of copper, and a workpiece of SKH-51 were employed, and the following electrical conditions were used:

current peak=1 A,
pulse width=2 μs and
pause interval=2 μs.

In FIGS. 5(a) and 5(b), the machining solution was kerosene. In FIG. 5(b), silicon particles were mixed in the kerosene.

Furthermore, in the test cases of FIGS. 4 and 5, in order to carry out the processing under a wide inter-electrode gap, an auxiliary power unit of 0 to 20 V was used in addition to the main power unit of 80 V.

Figure 6:
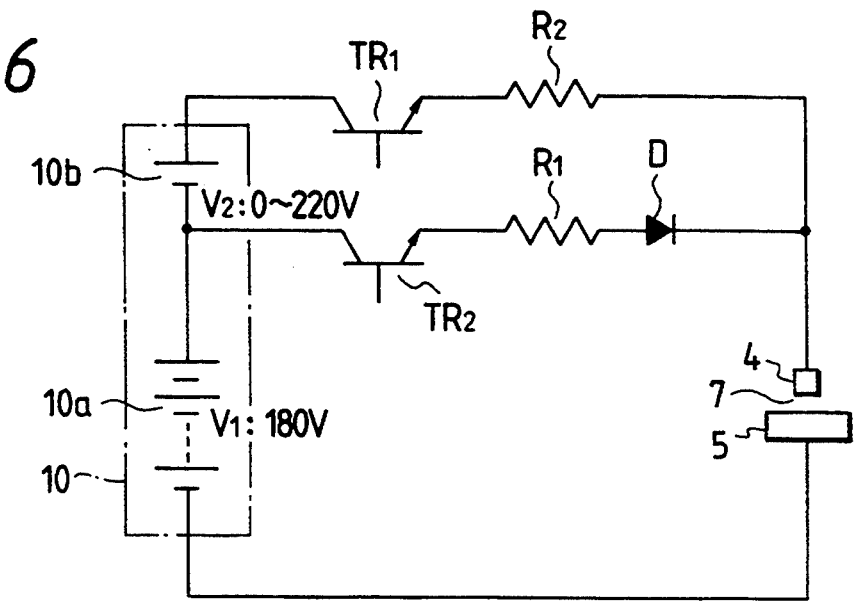
FIG. 6 is a circuit diagram showing an example of the electric power unit shown in FIG. 3, namely, a high voltage superposing circuit comprising a main power source and an auxiliary power source.

FIG. 6 shows a high-voltage superposition circuit employed as a machining power supply, which includes current limiting resistors R1 of approximately 10 to 20Ω and R2 of approximately 100 to 300Ω. The circuit also includes a diode D, and transistors TR1 and TR2.

Figure 7A:
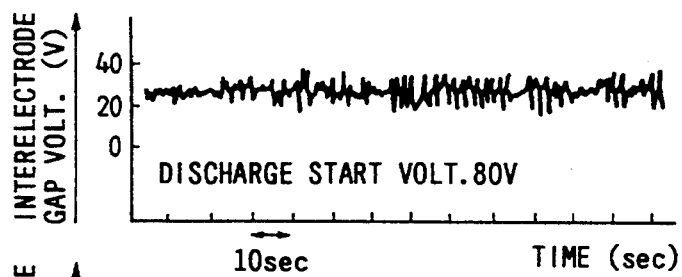
FIGS. 7(a), 7(b) and 7(c) are graphical representations indicating the degrees of machining stability for different discharge start voltages.
Figure 7B:
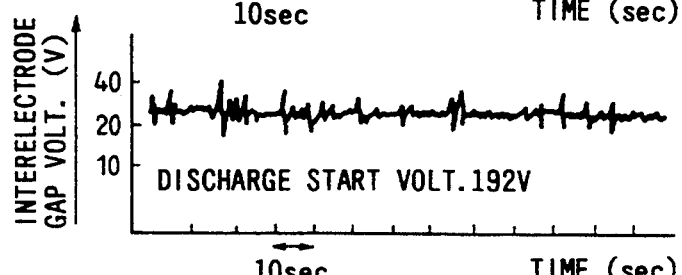
Figure 7C:
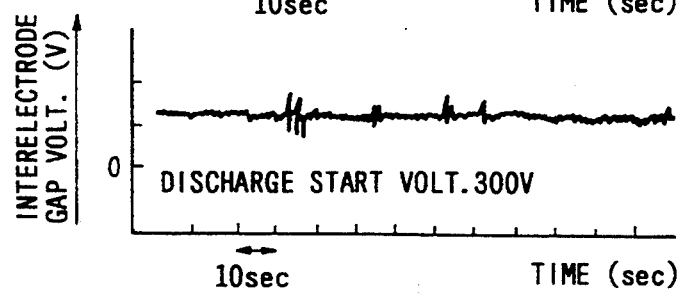

FIGS. 7(a)-7(c) show the degrees of stability in electric discharge machining operations carried out with the voltage of the auxiliary power unit changed with the high voltage superposing circuit.

As is apparent from FIGS. 7(a)-7(c), as a discharge start voltage (i.e. the voltage at which a current begins flowing between the workpiece and the electrode) increases, the degree of stability increased. Further, when silicon particles are present in the discharge gap and the voltage potential across the gap is maintained constant, electric discharges are liable to occur with a relatively wide inter-electrode gap width. Moreover, the machining operation is carried out more stably with higher voltage.

The test pieces obtained through the above-described experiments were immersed in aqua regia for fifty (50) minutes without eroding. The microphotographs of FIGS. 4 and 5 show the structures of the surfaces of the test pieces. As show in FIG. 4(a) no silicon cover film is formed when only the copper electrode is used and thus, the finished surface is rough. However, when silicon particles are added to the gap, a smooth silicon cover film is formed (FIG. 4(b)). FIG. 5(b) illustrate that molten silicon particles have struck the machining surface. When silicon particles are added to the discharge gap, the finished surface is smoother as shown in FIG. 5(b).

When a silicon electrode and an ordinary mineral oil (kerosene) are used, a silicon cover film takes about thirty minutes to form. However, in the above-described experiments, the silicon cover film was formed in about three to five minutes.

A multi-division machining circuit can be used, in which an electrode is electrically divided into parts according to machining conditions. These conditions include the discharging machining rate and a finished surface roughness. The electrode parts are connected through resistors to a power source.

Figure 8:
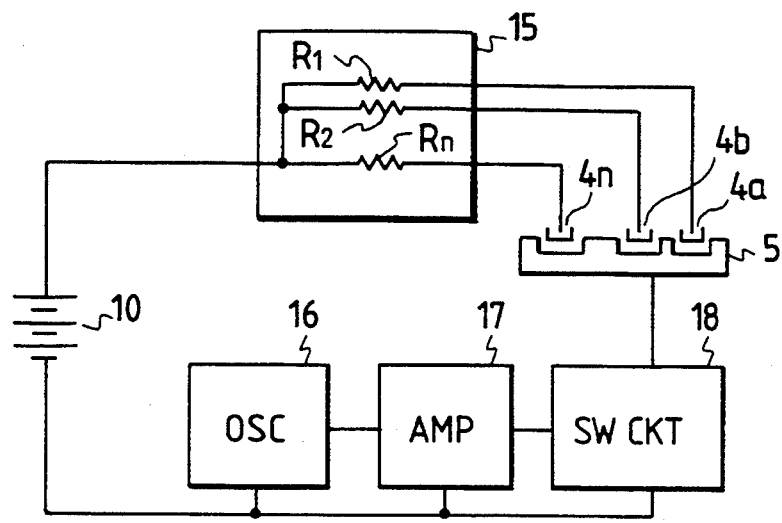
FIG. 8 is a theoretical circuit diagram showing another example of the electric power unit, namely, a multi-division machining circuit.

FIG. 8 shows another example of the EDM processing method according to the invention which employs the aforementioned multi-division machining circuit.

The apparatus of FIG. 8 includes a group of resistors 15, an oscillator 16, an amplifier 17, a transistor switching circuit 18 and electrode parts 4a, 4b, . . . and 4n.

An electrode having electrical resistance is electrically divided into electric discharging parts. Thus, a number of electric discharges may be induced simultaneously. A typical example of the electrode is a silicon electrode. The same effects, as in the above-identified example, can be obtained with silicon particles provided in a number of inter-electrode gaps.

It has been founded through experimentation that, even in EDM operations with silicon particles provided in the discharge gap, under the same electrical conditions the finished surface roughness is higher when operated with the following electrodes having electrical resistance: a silicon electrode, an electrode having an SiC surface which is formed by reacting a graphite surface with silicon, and electrodes made of mixtures of silicon particles and zinc, of silicon particle and copper, of silicon and water glass, and of silicon, zinc and water glass.

As was described above, in the present method, a material, formed of particles, is disposed in the discharge gap and is used to form a surface layer on the workpiece by inducing electric discharges. However, the method still suffers from the problem that material particles such as silicon particles for surface treatment may combine with one another.

FIGS. 9-12 show another embodiment of the invention in which a swinging mechanism is employed to prevent the particles of material for surface treatment from sticking to one another.

Figure 9:
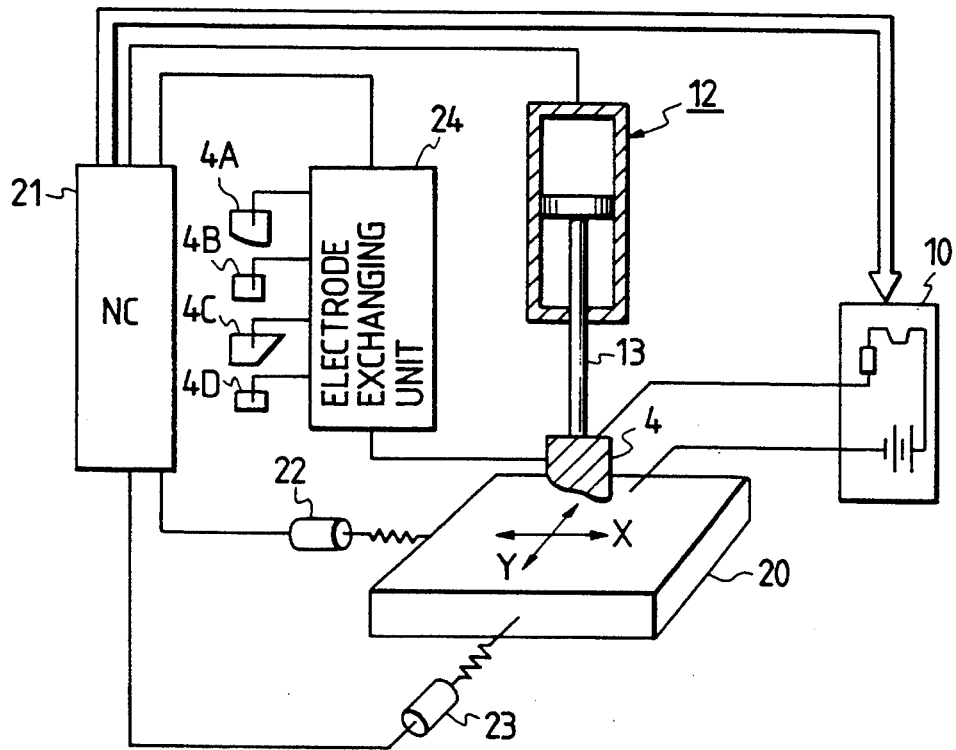
FIG. 9 is an explanatory diagram, corresponding to FIGS. 3(a) and 3(b), showing the arrangement of an apparatus for practicing another example of the method according to the invention.

In FIG. 9, a table 9 is used to mount a workpiece (not shown) thereon to be machined. The device also includes an electrode 4 confronting the workpiece and exchanging electrodes 4A, 4B, 4C and 4D. A hydraulic cylinder 12 is used for servo-control of the electrode 4 and a numerical control unit 21 is used for servo-control of the hydraulic cylinder 12. An X-axis motor 22 moves the table 20 in an X-axis direction, a Y-axis motor 23 moves the table 20 in a Y-axis direction, and an electrode exchanging unit 24 automatically exchanges the electrodes 4A through 4D in response to machining fineness (i.e., a rough machining step, middle machining step, and finish machining step). Further in FIG. 9, a machining electric power unit 10 supplies machining energy to the discharge gap between the electrode 4 and the workpiece (not shown). A piston rod 13 of the hydraulic cylinder 12 is connected to the electrode 4.

A machining vessel (not shown) containing a machining solution is mounted on the table 20. The numerical control unit 21 operates to control the operations of the X-axis motor 22 and the Y-axis motor 23, the operation of the electrode exchanging unit 24, and the electrical conditions of the machining electric power unit 10 as well as the operation of the hydraulic cylinder 12. Swinging motions, which are illustrated in FIG. 10, are performed between the electrode 4 and the workpiece. This moves the material particles, such as silicon particles.

In addition, the invention prevents increased surface roughness by limiting the current flow from the auxiliary power supply. Rough surfaces are typically caused by a voltage increase from the auxiliary power supply 10b (FIG. 6). Specifically the current supplied by the auxiliary power supply 10b is limited by the current limiting resistor R2 (FIG. 6).

Figure 11A:
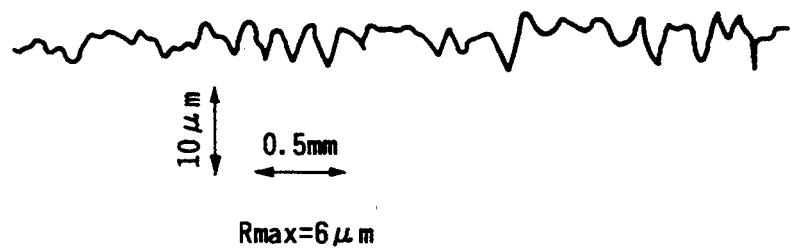
FIGS. 11(a), 11(b) and 11(c) are explanatory diagrams showing how the roughness of a finished surface depends on swinging motion given to material particles such as silicon particles.
Figure 11B:
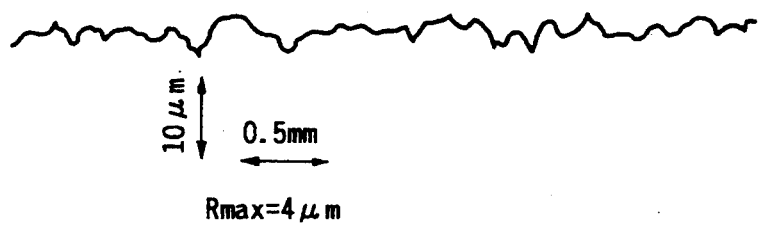
Figure 11C:
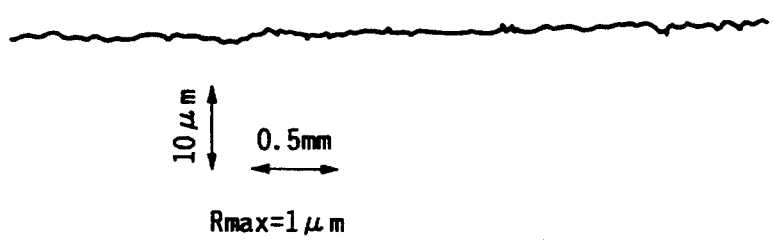
Figure 13:
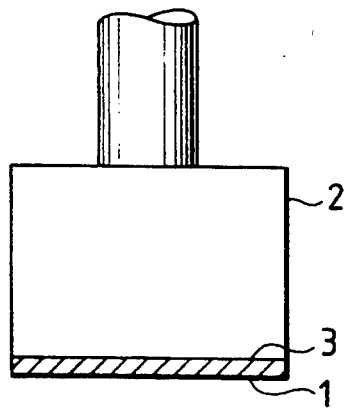
FIG. 13 is a diagram showing a machining electrode for a description of a conventional method of forming a surface layer by electric discharge machining.

FIGS. 11(a)-11(c) illustrate the results of experiments using the present swinging method using the following machining conditions:

Machining conditions:
(1) Electrode: Copper
(2) Workpiece: High-speed steel (SKH-51)
(3) Dielectric: Kerosene mixed with silicon particles at a ratio of 20 g/l
(4) Electrical conditions: Current peak value: Ip=1
  (A) Pulse width: $\tau p = 2$ $\mu s$ Stop width: $\tau s = 2$ $\mu s$
(5) Electrode polarity: negative (−)

FIG. 11(a) shows the surface roughness which is provided when the machining solution contains no silicon particles. FIG. 11(b) shows the surface roughness which is obtained when the machining solution contains silicon particles, but the electrode is not swung in accordance with the present method. FIG. 11(c) shows the surface roughness obtained when the machining solution contains silicon particles, and the swinging motion of the present invention is used (the swinging speed is approximately 96 mm/min).

Figure 12A:
FIGS. 12(a) and 12(b) are microphotographs for a description of the effects of the method described with reference to FIG. 9.
Figure 12B:

FIGS. 12(a) and 12(b) are microphotographs showing the metal structure for a description of the effects of the above-mentioned example of the present swinging method. More specifically, FIG. 12(a) shows the metal structure provided when the machining solution contains silicon particles, but no swinging motion is provided in the inter-electrode gap between the electrode 4 and the workpiece. FIG. 12(b) shows the metal structure provided when the machining solution contains silicon particles, and the swinging motion is used. In FIG. 12(a), the silicon particles are fixedly combined with one another, and the finished surface is rather rough. However, as shown in FIG. 12(b), When the swinging motion is used, the finished surface is made much smoother. This is because the silicon particles are moved and remain uniformly dispersed in the inter-electrode space between the electrode 4 and the workpiece throughout discharging.

Figure 14:
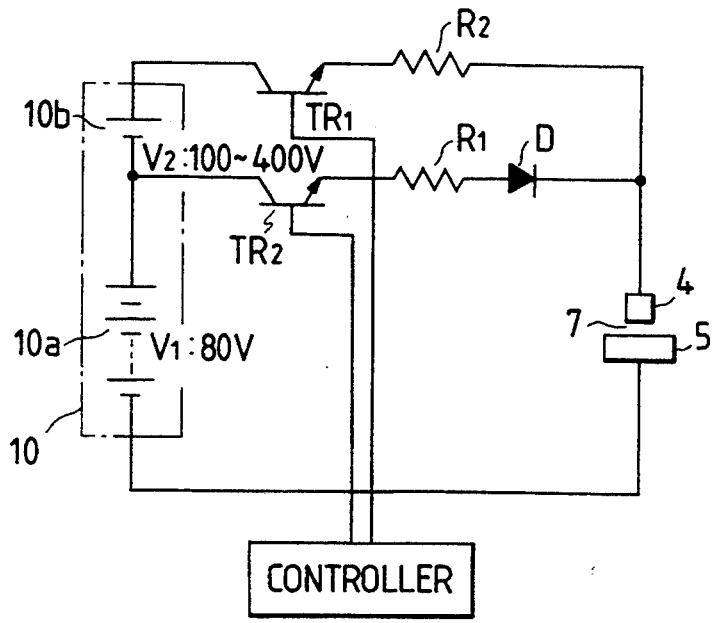
FIG. 14 is a circuit diagram of another embodiment for the high voltage superposing circuit for the present invention.

FIG. 14 illustrates a high-voltage superposition circuit used by an alternative embodiment as the machining power supply. The superposition circuit of FIG. 14 substantially resembles the circuit of FIG. 6, except that the output of the auxiliary power supply 10b is approximately 100-400 V. The output of the main power supply is approximately 80 V.

Figure 15A:
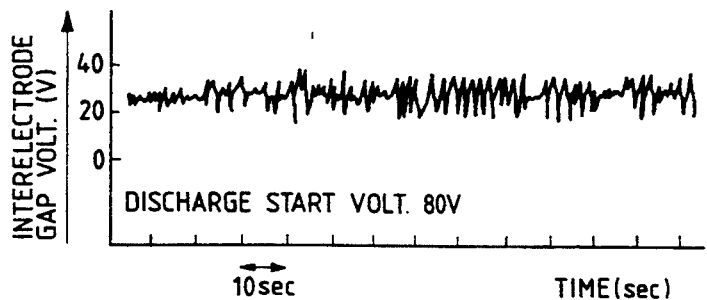
FIGS. 15(a), 15(b) and 15(c) are graphical representations indicating the degrees of machining stability with discharge start voltages for the circuit of FIG. 14.
Figure 15B:
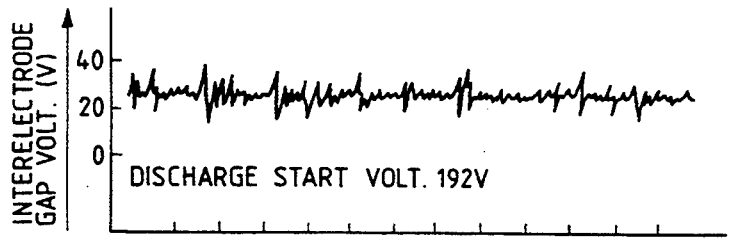
Figure 15C:
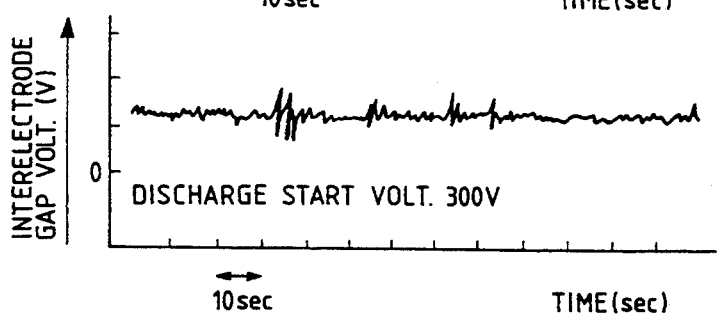

During machining, the auxiliary power supply 10b supplies a high voltage of 200-500 V to the machining gap 7. Particularly, during machining, transistor TR1 is switched ON to force the auxiliary power supply 10b to supply a high voltage to the machining gap 7 to produce an electric spark. Transistor TR2 is then switched ON to force the main power supply 10a to supply a discharge current which lasts for several micro-seconds ($\mu sec$). The duration of the discharge is determined by the limiting resistor R1. Since the applied voltage is high, the machining gap may be expanded while maintaining extremely stable machining. The results of experiments on machining stability by the application of a high voltage are shown in FIGS. 15(a)-15(c).

FIGS. 1(a)-15(c) show the degrees of stability in electric discharge machining operations carried out with the voltage of the auxiliary power unit changed with the high voltage superposing circuit of FIG. 14.

Figure 16A:
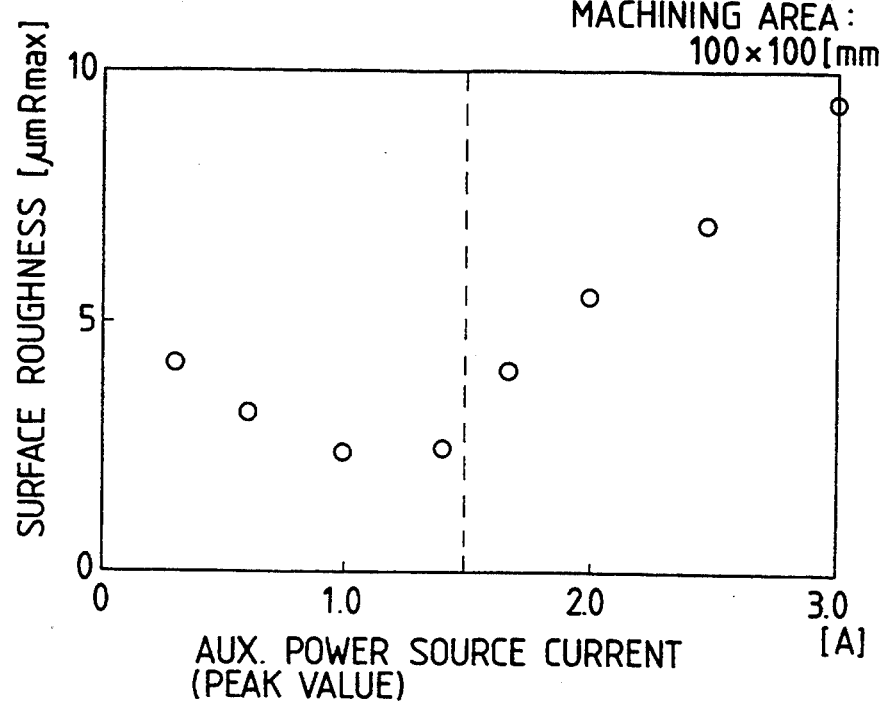
FIG. 16(a) is a relation between an auxiliary power supply current value and the surface roughness of the workpiece.
Figure 16B:
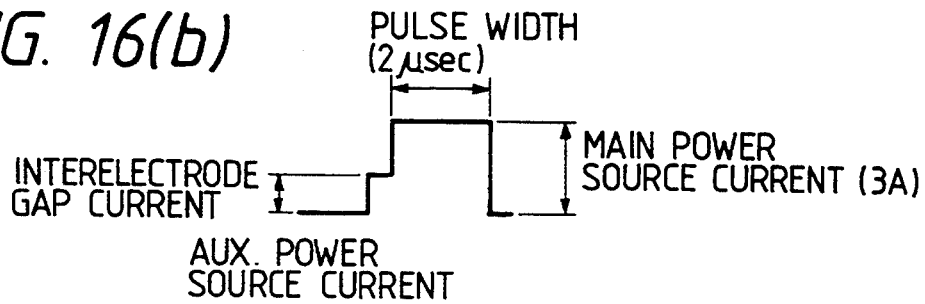
FIG. 16(b) is a current pulse applied to the electrode.

FIG. 16(a) shows a relationship between the current level provided by the auxiliary power supply 10b (FIG. 14) and the surface roughness after a large area has been finished with mixed powder. FIG. 16(a) illustrates that the surface roughness worsens as the current level increases above 1.5 A. However, the experiments have shown that the surface roughness also worsens when the current value is too small. The following machining and electrical conditions were used to obtain the experimental data illustrated in FIG. 16(a):

Machining conditions:
(1) Electrode: Copper
(2) Workpiece: High-speed steel (SKH-51)
(3) Dielectric: Kerosene mixed with silicon particles at a ratio of 20g/l
(4) Electrical conditions: Current peak value: Ip=3 A Pulse width: $\tau p=2$ µs Stop width: $\tau s=2$ µs Polarity: Electrode (+)

While a large area may be machined with low surface roughness when the mixed powder is used, as the machining area increases, the capacitance across the workpiece/electrode gap also increases. An increase in the capacitance between the electrode 4 and the workpiece 5 during machining of this large area influences the rate at which the voltage potential across the gap 7 increases (hereafter the "rise time").

Figure 17A:
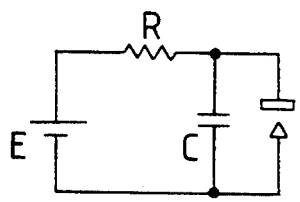
FIG. 17(a) shows a model RC-circuit that represents the RC characteristic of the embodiment of FIG. 14 of the present invention.
Figure 17B:
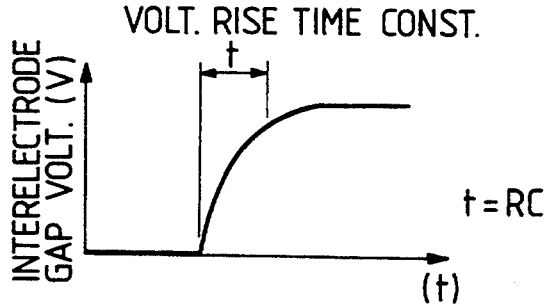
FIG. 17(b) shows the machining gap voltage response achieved by the RC-circuit in FIG. 17(a)

FIG. 17(a) illustrates a model RC-circuit which represents the RC characteristic exhibited by the workpiece 5 and electrode 4 in FIG. 14, across the machining gap 7. As shown in FIG. 17(b), the time constant t, corresponding to the RC characteristic of the machining gap 7, is t=RC. If a resistance value R is large, such as when the current of the auxiliary power supply 10b is too small, the voltage rise time t increases. In this state, the frequency with which discharges occur decreases and machining is not stabilized, even when the powder mixture is used, resulting in more surface roughness.

In consideration of the above, the experiments indicate that a current value of approximately 1.5 A is optimal. This represents the current value provided by the auxiliary power supply. A mirror surface of the lowest surface roughness is provided at the current value of approximately 1.5 A. To provide the optimum current value, the value of the limiting resistor R2 for the auxiliary power supply must be set to an appropriate value.

As described above, 100 to 400 V is adequate for the voltage of the auxiliary power supply 10b (FIG. 14) to keep machining stabilized. To set the current value to 1.5 A in this voltage range, the limiting resistor value R2 is maintained at R2=100 to 300Ω.

Figure 18A:
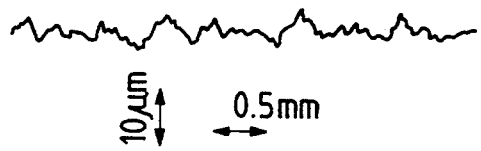
FIGS. 18(a) and 18(b) indicate a relationship between a current limiting resistance of the auxiliary power supply and surface roughness according to the embodiment of FIG. 14 of the present invention.
Figure 18B:
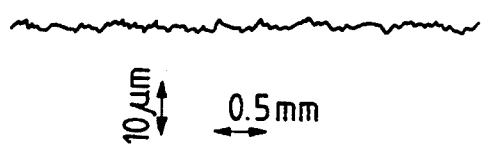

FIG. 18(a) shows the surface roughness at a time when R2 equals 20 and FIG. 18(b) shows the surface roughness when R2 equals 200Ω. Further it has been confirmed that the present invention extends the life of the powder material to approximately 500 hours, as compared to an ordinary life of 100 to 200 hours.

While the auxiliary power supply is used with the main power supply to superpose a high voltage in the above embodiment illustrated in FIG. 14, a similar effect can be produced in machining that does not use an auxiliary supply but still uses the mixed powder. This effect is achieved with mixed powder by using a main power supply that generates a high voltage of 200–500 V without using the auxiliary power supply. In this alternative, embodiment, the current for the main power supply is limited by setting the current limiting resistor R1 at 100–300Ω.

Another embodiment of the invention will now be described. However, prior to the description of this embodiment, the principal behind cracking will be described for single and continuous electric spark machining.

Figure 19:
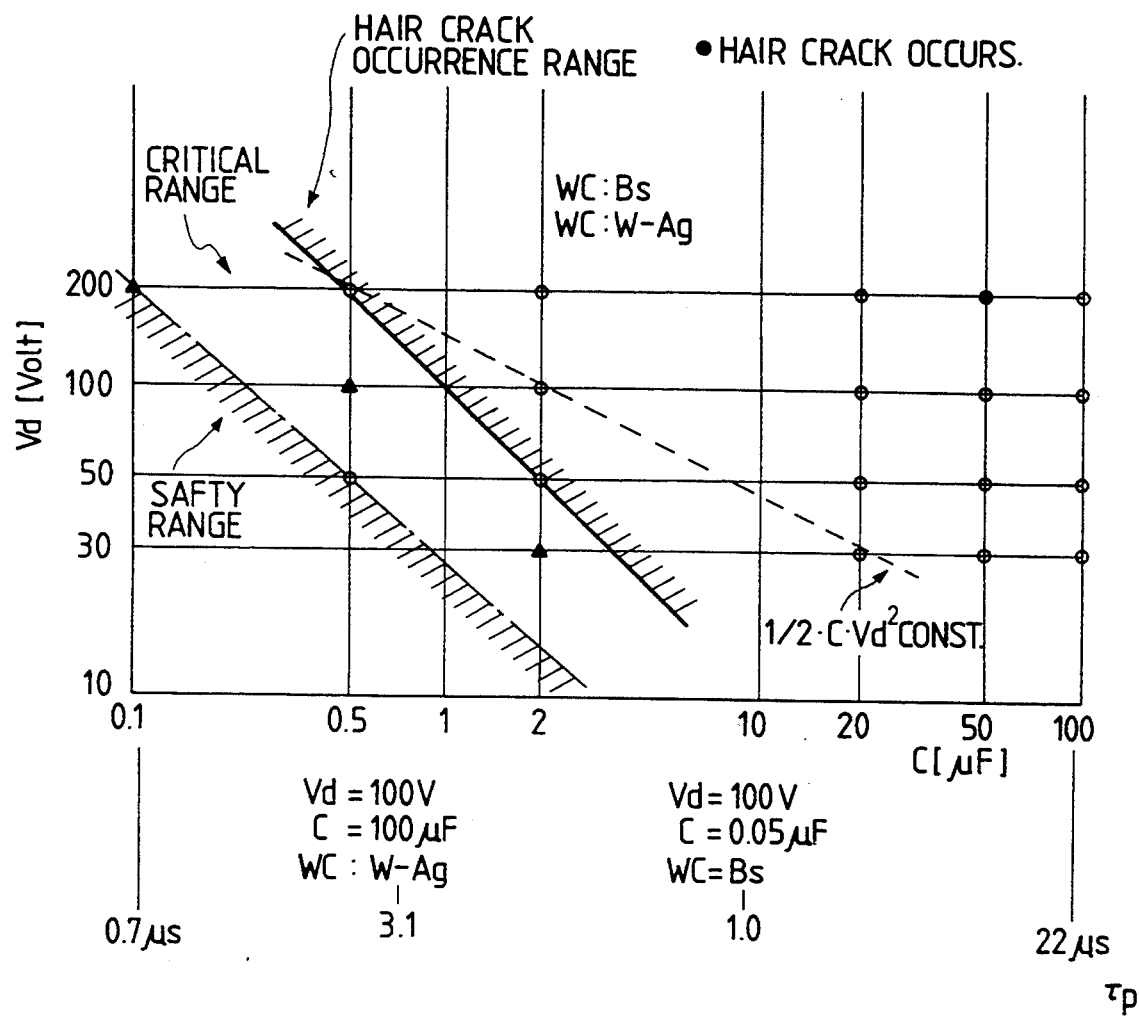
FIG. 19 illustrates how cracking occurs in response to a single electric spark according to the invention.

Materials having high resistance to high temperature (e.g., tungsten carbides inter-alloy WC-Co, conductive ceramics, or alloy tool steel SKD-11, SKD-51, SKH-51, etc.) are generally easily cracked during continuous electrode discharge machining. When an electric spark is emitted, the electrical condition that causes cracking may be seen. Specifically, during a single electric spark the discharge of energy is extremely large as shown in FIG. 19. A cracking range of tungsten carbide by a single spark is also shown in FIG. 19. The material must be finished under machining conditions that do not cause cracking.

In continuous electron discharge machining, however, cracking occurs even when there is a much lower discharge energy. Specific examples are shown in FIG. 20(a), 20(b) and FIG. 21(a) and 21(b).

Figure 20A:
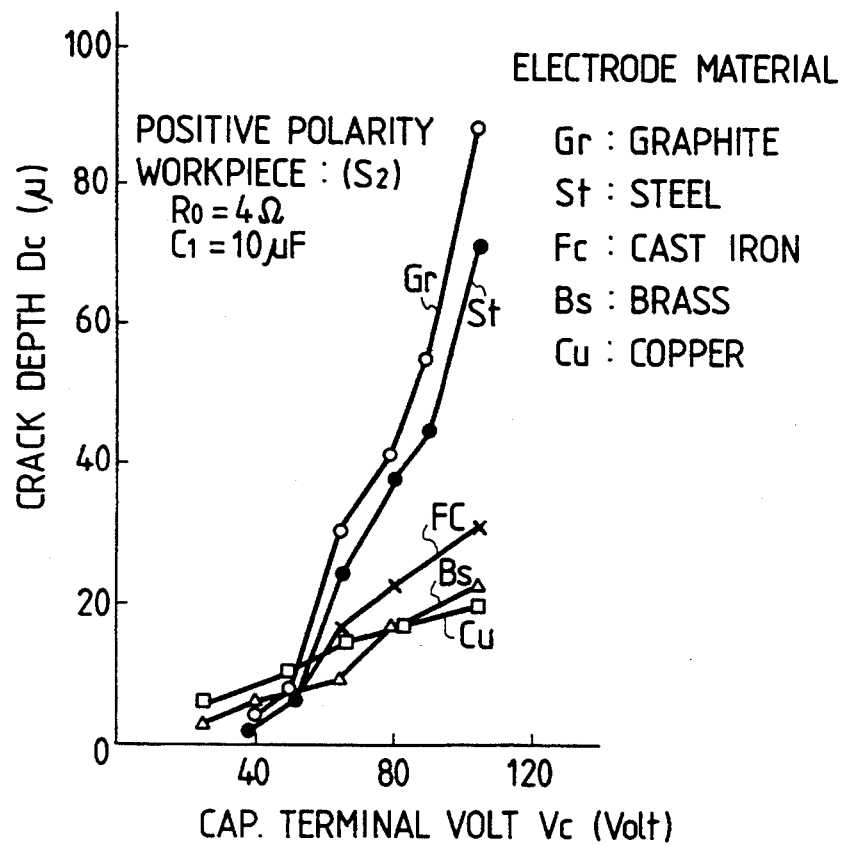
FIGS. 20(a) and 20(b) illustrate how cracking occurs in response to continuous electric sparks in accordance with the invention.
Figure 20B:
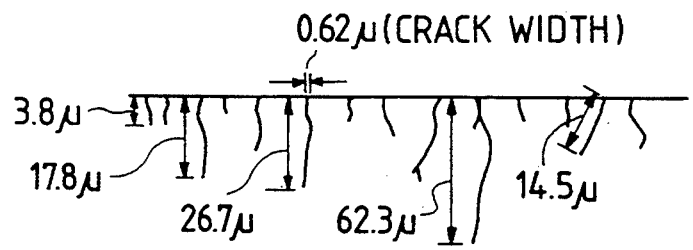

Further, while cracking does not occur with a single electric spark when the discharging voltage Vc equals 65 V and the capacitor capacity C equals 0.1 F. (tungsten carbide), cracking does occur if continuous electric sparks are applied at this voltage and capacitance. FIGS. 20(a) and 20(b) illustrate this cracking condition. It is understood that when charging resistance is large and the frequency of discharge occurrence is small, the depth and thickness of cracking are small. Further, as the charging resistance decreases and the frequency of discharge increases, the depth and thickness of cracking increases.

The above results make it clear that (1) even under a condition when cracking does not occur in a single electric spark, cracking can occur on a surface subjected to continuous electronic discharge machining; and (2) as the number of electric sparks increases, cracking occurs more easily and in a deeper and thicker form.

Figure 21A:
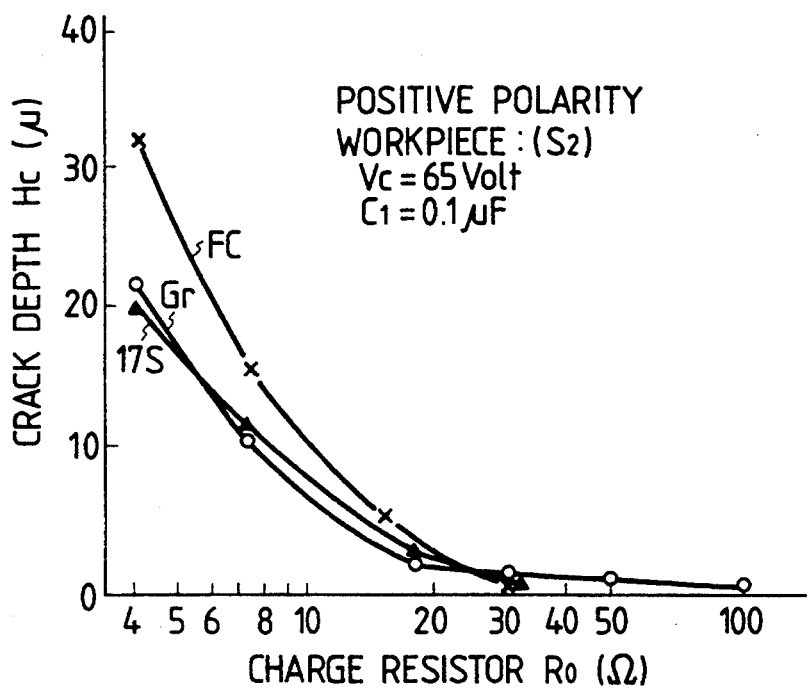
FIGS. 21(a) and 21(b) indicate relationships between charging resistance and the depth and thickness of cracking.
Figure 21B:
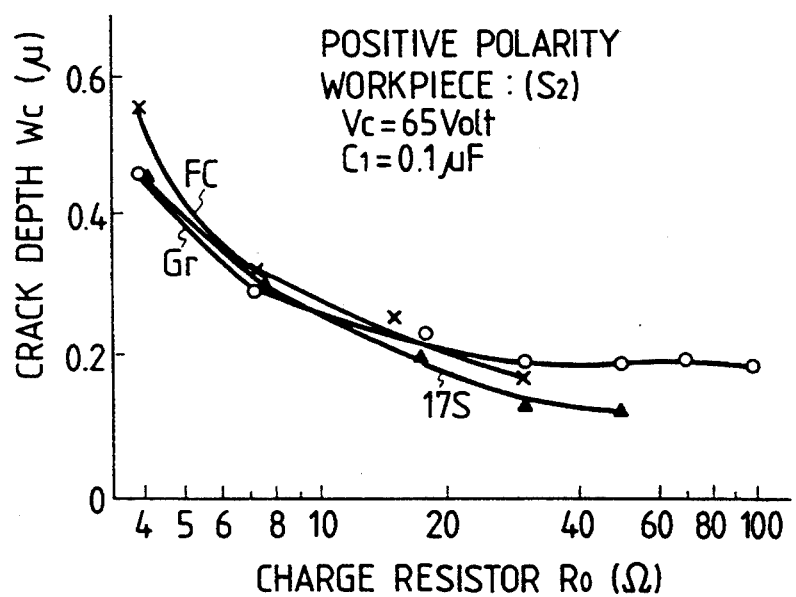

This may be understood from the following relationship between charging resistance $R_0$ and the number of sparks f as illustrated in FIGS. 21(a) and 21(b):

$$f=(k)/(C \cdot R0);$$

where k=a coefficient of about 0.5 to 1. Thus as R0 decreases, f increases.

It should be noted that cracking is made deeper and wider when the number of electric sparks increases. When the charging resistance is very large, the results are close to those of a single electric spark.

The depth and thickness of cracks increases when the number of discharges increases since, as more electric sparks are generated, the ion concentration in the machining gap increases. When the ion concentration increases, it causes continuous electric sparks in an area previously subjected to discharge or in the vicinity thereof, causing a so-called focused discharge. The focused discharge greatly increases the temperature in its vicinity. This higher temperature extends to the inner regions or depths of the electrode material by the discharge heat of multiple surfaces. After the focused discharge occurs the point of discharge moves to other locations on the material due to expansion of the machining gap distance. The surface of the portion that has been heated by the focused discharge is rapidly cooled by the dielectric. Since this portion is cooled from its outer surface toward the inner portion, the surface shrinks while its inner portion remains unshrunk and at the high temperature. Hence, tensile stress develops in the surface, causing cracking.

The centralized or focused discharges have a tendency similar to the provision of a single discharge spark generated by a long pulse width. Thus, in a single electric spark, large tensile stress does not develop in the workpiece surface when the discharge energy range is small and the pulse width is short, e.g., when the capacitance C is small. This lack of tensile stress is due to the fact that the electrode's and workpiece's outer surface are subjected to small energy discharges and thus, heat is not transmitted deeply into the workpiece body.

If the material is heated only on the surface, the cracking is negligibly small since the hot portion is instantly cooled before heating the workpiece's body. The temperature difference between the surface and inner portions is compensated for before any crack develops, and the stress difference is maintained small.

The following mathematical expression applies to the pulse width $\tau p$ and the current ip developed by capacitor discharge:

$$\tau p = 0.7 \text{ s}, \text{ip} = 15 \text{ A} \qquad (1)$$

Thus, cracking may be prevented by avoiding focused discharges, which are avoided by using a discharge energy level small enough not to cause cracking in a single electric spark. The experiments have made it clear that two measures to avoid the centralized discharges are effective.

First, the invention increases the machining gap distance. This facilitates the circulation of the dielectric in the machining gap, in order to cool the discharge point and making deionization easier. By de-ionizing the dielectric, the invention ensures that the dielectric provides a uniform insulated layer between the electrode and workpiece. Re-establishing the insulated layer between the workpiece and electrode prevents centralized discharge. The application of a high voltage across a high impedance gap is effective to de-centralize discharge.

Moreover, increasing the concentration of the powder mixture and increasing the mixing effect can allow the machining gap distance to be increased. Thus, the machining gap distance can be further expanded by high-voltage superposition and concentrating the powder mixture.

Secondly, to facilitate the dispersion of discharge, the invention prevents any potential inclination in the machining gap to be focused on a given discharge mark. The invention prevents focusing by mixing a large amount of conductive or semiconductive (semiconductor) powder in the dielectric. Specifically, the dielectric is mixed with semiconductive or metallic powder such as Si powder (30 $\mu$m maximum), carbon powder (30 $\mu$m maximum) or Al powder (30 $\mu$m maximum or scaly).

Figure 22A:
FIGS. 22(a) and 22(b) are photos of a machined surface showing the results of electric discharge machining under electrical conditions of medium degree according to the present invention.
Figure 22B:
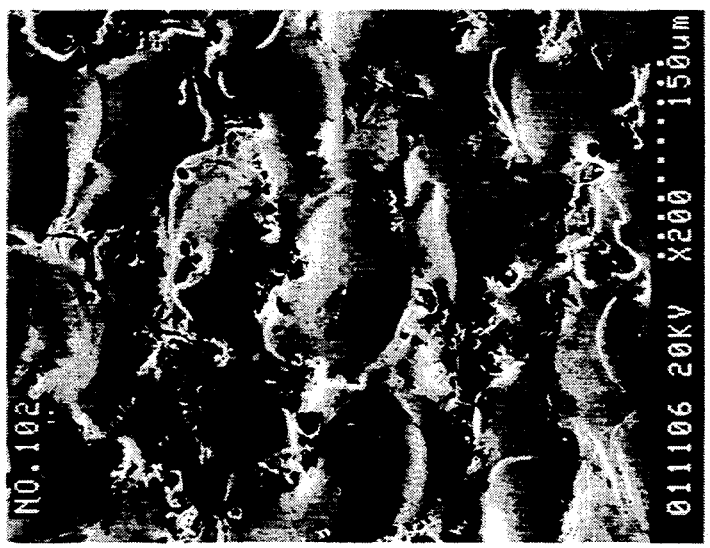
Figure 23A:
FIGS. 23(a) and 23(b) are photos of a machined surface showing the results of electric discharge machining using dielectric mixed with powder according to the present invention.
Figure 23B:

FIGS. 22(a) and 22(b) show the results of ordinary electron discharge machining on high speed steel (SKH-51) performed under the electrical conditions of a medium machining degree. This medium machining degree would ordinarily never cause cracking in a single electric spark (Ip=10 A, $\tau p$=16 $\mu$s, duty =50%, i.e. $\tau r$=16 $\mu$s). FIGS. 23(a) and 23(b) show the results of machining under the identical electrical conditions with Si powder mixed at 20 g/l.

These figures indicate that while cracking has occurred in the ordinary dielectric, no cracking has developed in the material machined in the dielectric mixed with the Si powder. Proof that the Si powder mixing process does not cause cracking is provided by the fact that the material is not corroded at all after it is immersed in aqua regia or the like for 50 minutes. Any material that develops cracks is easily corroded. Tungsten carbide will not develop cracking when machined within the safe, single electric spark range illustrated in FIG. 19, if the powder, such as Si, powder, is added to the dielectric.

Figure 24:
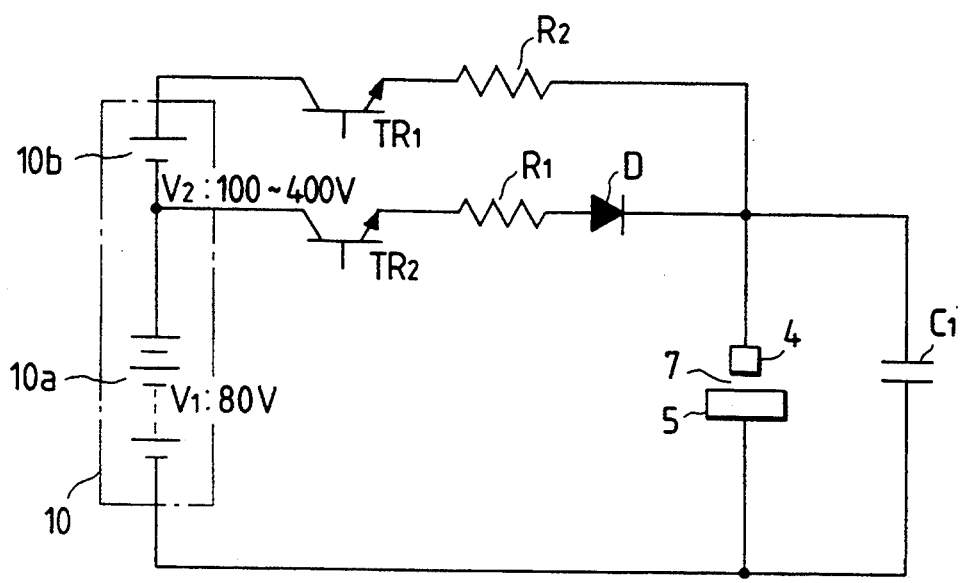
FIG. 24 illustrates a high-voltage superposition circuit employed as a machining power supply according the present invention.

An alternative embodiment of the invention will now be described in reference to FIGS. 3(a), 3(b) and 24.

In the system shown in FIGS. 3(a) and 3(b), carries out machining, as explained above, in the machining gap 7 formed by the workpiece 5 and the electrode 4, wherein the gap is surrounded with the dielectric 8 mixed with the silicon powder 9.

However, in this alternative embodiment, a high-voltage superposition circuit (FIG. 24) is employed as a machining power supply. The superposition circuit includes current limiting resistors R1 and R2, a diode D, transistors TR1 and TR2, a capacitor C1, a main power supply 10a, and an auxiliary power supply 10b.

During machining, the auxiliary power supply 10b supplies a high voltage to the machining gap 7 when transistor TR1 is switched ON, in order to supply the high voltage to the machining gap 7 to generate discharges. Transistor TR2 is thereafter switched ON to cause the main power supply 10a to supply a discharge current of low energy. The superposition circuit of FIG. 24 reduces cracking by allowing the machining gap to be increased and by facilitating dispersion of the discharge.

A range in which cracking is not produced by single electron discharge machining varies according to the type of workpiece material. Fundamentally, materials having high resistance to high temperature, e.g., WC-Co and fine ceramics, are cracked by comparatively small amounts of energy. A typical example is shown in FIG. 19. For alloy tool steel, such as SKD-11, SKD-51 and SKH-51, cracking may occur at Ip of 20 A or higher and $\tau p$ of 40 $\mu$s or greater.

The present invention may be embodied in other specific forms without departing from the spirit and essential attributes thereof. In addition to the above-described silicon particles, other metal particles such as for instance tungsten carbide (WC) particles may be used. Furthermore, the particles of semi-metal material such as zirconium boride ($ZrB_2$), or the particles of carbonate material, or boride material i.e., fine ceramic material may be used for formation of surface layers.

The machining solution is not always limited to mineral oil. That is, silicon oil or water (distilled water) may be employed as long as electric discharges will occur in it. The surface layer can be formed even on a ceramic material which is not electrically conductive. In this case, only the target surface of the ceramic material is made electrically conductive by electroless plating or spectacle reaction.

The surface layer may be formed by using a material which is not electrically conductive. In this case, the material is formed into particles as fine as possible, and the material particles thus formed are mixed with electrically conductive particles. The above-described operation is carried out by using the particles thus prepared. The non-conductive material can be alumina ($Al_2O_3$) for instance.

The same effects can be obtained according to the following method: Disposing particles of material, such as silicon for formation of a surface layer, between the electrode and the workpiece which are held in air, and inducing electric discharges therebetween.

In the above-described various embodiments of the invention, a key point is to dispose a sufficient number of material particles such as silicon particles for formation of a surface layer in the inter-electrode space. This makes the inter-electrode distance larger than the ordinary one, to allow the presence of the material particles such as silicon particles in an amount more than the amount of material removed from the workpiece per electric discharge near the discharge point.

As was described above, in the method of the invention, a material for formation of a surface layer on a workpiece is provided in the form of fine particles in the inter-electrode gap. Under this condition, electric discharges are induced therein. Therefore, the resultant surface layer is higher in corrosion resistance and in adhesion than what is formed with an ordinary discharge machining electrode. In the conventional high temperature nitriding method or CVD, the surface treatment is carried out at temperatures around 900°, and therefore the workpiece is liable to be strained or softened; and if the temperature is decreased, then the surface layer formed is liable to peel off. On the other hand, in the method of the invention, the workpiece will not be strained nor softened. Thus, the method of the invention may be suitably employed for surface treatment of a variety of workpieces.

According to another aspect of the invention, the material particles between the electrode and the workpiece are moved during electric discharge, which prevents the difficulty that the material particles such as silicon particles stick to one another, resulting in lowering the roughness of the surface layer formed on the workpiece.

What is claimed is:

1. An electric discharge machining apparatus for forming a surface layer on a workpiece, comprising:
   an electrode positioned near the workpiece, wherein a machining gap is formed between the electrode and the workpiece, said machining gap containing a dielectric machining liquid which has a suspension of submetallic particles therein;
   a main power supply circuit for supplying a low voltage to the machining gap; and
   a high voltage superimposition circuit for superposing a high voltage on said main circuit, in order to generate an electric spark in the machining gap and in the dielectric mixture;
   wherein the spark causes at least one of the submetallic particles to become molten along with a part of the workpiece to form a strong, smooth surface layer on the workpiece.

2. An electric discharge machining apparatus according to claim 1, further comprising:
   a first current limiting resistor, connected between the high-voltage superposition circuit and the electrode, for limiting the current flow from the high-voltage superposition circuit, and
   a second current limiting resistor, connected between the main power source and the electrode, for limiting the current flow from the main power source.

3. An electric discharge machining apparatus according to claim 2, wherein an output voltage of the high-voltage superposition circuit is between 100 and 400 volts, and a resistance of the first and second current limiting resistance circuit is between 10 and 20 ohms, and 100 and 300 ohms, respectively.

4. An electric discharge machining apparatus according to claim 7, further comprising:
   a first transistor circuit, connected in series with the first current limiting resistor, for turning the high-voltage superposition circuit ON and OFF, and
   a second transistor circuit, connected in series with the second current limiting resistor, for turning the main power supply ON and OFF.

5. An electric discharge machining apparatus according to claim 4, further comprising:
   a controller for turning said first transistor circuit ON, in order for said high-voltage superposition circuit to produce an electric spark across said machining gap, and for turning said second transistor circuit ON, in order for said main power supply to supply a discharge current across said machining gap, wherein a duration of said discharge current lasts for several micro-seconds and is determined by the resistance of said second resistor.

6. An electric discharge machining apparatus according to claim 1, wherein an output voltage of the high-voltage superposition circuit is between 100 and 400 volts.

7. An electric discharge machining apparatus according to claim 1, wherein the high-voltage superposition circuit outputs a high voltage between 200 and 500 volts.

8. An electric discharge machining apparatus according to claim 1, further comprising current limiting means for limiting a current flow through said electrode to approximately 1.5 amps, in order to minimize surface roughness on the workpiece.

9. An electric discharge machining apparatus according to claim 1, further comprising:
   a controller for turning said high-voltage superposition circuit ON to produce an electric potential across said machining gap, and for turning said main power supply ON to supply a discharge current across said machining gap, wherein a duration of said discharge current equals several micro-seconds.

10. An electric discharge machining apparatus as claimed in claim 1, wherein said powder comprises silicon particles.

11. An electric discharge machining apparatus as claimed in claim 1, wherein said powder comprises silicon particles having an average grain size of 20–40 $\mu$m, said powder being mixed at a ratio of 20 gr/l of said dielectric machining liquid.

12. An electric discharge machining apparatus for forming a surface layer on a workpiece, comprising:
    an electrode positioned near the workpiece, wherein a machining gap is formed between the electrode and the workpiece, said machining gap containing a dielectric machining liquid which includes a suspension of submetallic particles;
    means for producing a relative swinging motion between said electrode and the workpiece;
    a main power supply circuit for supplying a low voltage to the machining gap; and
    a high voltage superimposition circuit for superposing a high voltage on said main circuit, in order to generate an electric spark in the machining gap and in the dielectric mixture;
    wherein the spark causes at least one of the submetallic particles to become molten along with a part of the workpiece to form a strong, smooth surface layer on the workpiece.

* * * * *